United States Patent [19]

Scott

[11] Patent Number: 5,234,307
[45] Date of Patent: Aug. 10, 1993

[54] MOTORCYCLE TRAILER DEVICE

[76] Inventor: Gerald W. Scott, 16015 Johnson Mill Rd., Sedley, Va. 23878

[21] Appl. No.: 832,239

[22] Filed: Feb. 7, 1992

[51] Int. Cl.$^5$ ................................................ B60P 3/07
[52] U.S. Cl. ...................................... 414/467; 280/62; 414/482; 414/500; 414/537
[58] Field of Search ............... 414/469, 480, 482, 485, 414/491, 494, 498, 500, 559, 467, 537, 538; 280/62

[56] References Cited

U.S. PATENT DOCUMENTS

| | | | |
|---|---|---|---|
| 3,604,579 | 9/1971 | Jenkins | 414/482 |
| 3,822,798 | 7/1974 | Neff | 296/168 X |
| 3,997,186 | 12/1976 | Pottorff | 280/402 |
| 4,032,167 | 6/1977 | Chereda | 280/400 X |
| 4,154,352 | 5/1979 | Fowler | 280/43.17 X |
| 4,420,182 | 12/1983 | Kaneshiro | 296/168 X |
| 4,749,317 | 6/1988 | Daniel | 414/482 X |
| 4,752,177 | 6/1988 | Zenna | 280/656 X |
| 4,932,829 | 6/1990 | Miller | 414/480 X |
| 4,944,648 | 7/1990 | Parr | 414/482 X |
| 4,968,210 | 11/1990 | Friederich | 414/494 X |

FOREIGN PATENT DOCUMENTS 8804618  6/1988  World Int. Prop. O. .......... 414/482

Primary Examiner—Michael S. Huppert
Assistant Examiner—James Keenan

[57] ABSTRACT

Three-wheeled motorcycle dolly adapted for use in conjunction with roll-back tow truck has wide wheel base and low elevation decking. Rigid eyes are provided along frame for strapping motorcycle in upright position to dolly. Convex wheel stop rigidly attached to front of dolly provides permanent chocking for forward wheel of motorcycle. On-loading and off-loading of motorcycle are accomplished by single person with aid of detachable ramp, and inclined push rails on sides of dolly.

1 Claim, 5 Drawing Sheets

MOTORCYCLE TRAILER DEVICE

FIELD OF INVENTION

The present invention relates to motorcycle trailering apparatus. More particularly, the present invention relates to a motorcycle dolly adapted to be used with a roll-back tow truck.

BACKGROUND

There are essentially three general prior methods by which disabled motorcycles are transported.

The first prior method generally involves attaching a disabled motorcycle behind a moving vehicle, such as a car or a truck, and towing the disabled motorcycle. In most such prior devices, the front wheel of the motorcycle is secured to a rigid frame which, in turn, is pivotably attached to the towing vehicle. The rear wheel of the motorcycle typically remains supported by the roadway, and rolls along behind the towing vehicle. Typically the securing frame is detachably attached by means of a trailer hitch to the towing vehicle's rear bumper or undercarriage.

A problem of this prior method of transporting motorcycles is that the front wheel may be too damaged to seat securely into the rigid frame. Another problem of this prior method of transporting motorcycles is that the rear wheel may be too damaged to roll behind the towing vehicle, particularly at higher speeds. Another problem of this prior method of transporting motorcycles is that the additional load (drag) caused by the trailing motorcycle may make steering of the towing vehicle difficult. Another problem of this prior method of transporting motorcycles is that the overall combined length of the towing vehicle and trailing motorcycle is necessarily longer than the length of the towing vehicle alone, and, therefore, makes driving and parking of the combination difficult. Another problem of this prior method of transporting motorcycles is that it is very difficult, and in some cases virtually impossible, to operate the "towing vehicle" in reverse when the disabled motorcycle is attached in the described manner.

A second prior method of transporting disabled motorcycles generally involves placing the entire motorcycle onto a trailer which, in turn, is pivotably attached to the towing vehicle. Typically the motorcycle trailer is detachably attached via a trailer hitch to the towing vehicle's rear bumper or undercarriage.

This (second) prior method of transporting disabled motorcycles has as an advantage (over the first mentioned prior method) that it can be used to transport motorcycles whose wheels are damaged. Otherwise, this (second) prior method of transporting disabled motorcycles has associated with it all of the problems mentioned above in reference to towing the motorcycle. In addition, this method has the further disadvantage of necessitating that the disabled motorcycle be lifted or rolled up onto the trailer. Additionally the trailer itself must necessarily be constructed so as to comply with state and federal safety standards relating to towed vehicles, which renders the trailer relatively expensive. In addition, because the trailer must be constructed so as to safely travel over highways, the elevation of the bed of the trailer (i.e. the elevation to which the disabled motorcycle must be lifted), is necessarily fairly high. Thus, in most cases, at least two persons are necessary to provide enough strength to lift (or roll) the disabled motorcycle onto the trailer.

A third prior method of transporting disabled motorcycles involves placing the entire disabled motorcycle onto the back of a truck. Because the beds of most trucks are so high (e.g. several feet above the roadway), this is rarely done in practice using fixed bed trucks. A variation of this method of transporting disabled motorcycles is the use of roll-back tow trucks. Roll-back tow trucks have a flat bed which can be powered so as to extend backwards over the rear of the truck and tilt down until the rear of the bed touches the ground. Typically, roll-back tow trucks are provided with a power winch which is used to drag a disabled vehicle up onto the (inclined) truck bed. Once a disabled vehicle is pulled onto the truck bed, the truck bed may be powered back to its standard (forward and horizontal) position. Roll-back tow trucks are most commonly used for transporting disabled cars. When roll-back tow trucks are instead used for transporting disabled motorcycles, several problems are typically encountered. A most significant problem with prior methods of using roll-back tow trucks to carry disabled motorcycles is that at least two persons are required to get the motorcycle onto the bed of the truck. This is because the controls for the winch, the roll-back, and the tilting function are all located at a considerable distance from the disabled motorcycle itself. Thus, it is necessary, using this prior method, for one person to operate the two truck's power controls while a second person is required to steady the motorcycle and to hold it upright. Another problem with prior methods of using roll-back tow trucks to carry disabled motorcycles is that once on the tow truck's bed, it is difficult to keep the motorcycle steady and upright when the truck is in motion.

OBJECTS

Accordingly, it is an object of the present invention to provide a motorcycle dolly adapted to be rolled onto and secured to a roll-back tow truck.

It is another object of the present invention to provide a device of the character described wherein a disabled motorcycle can be easily put onto the dolly by one person.

It is another object of the present invention to provide a device of the character described which is adapted to carry motorcycles which have either functional or damaged wheels.

It is another object of the present invention to provide a device of the character described in which a motorcycle can be secured in the upright position to the dolly by a single person.

It is another object of the present invention to provide a device of the character described which is adapted to be engaged by a winch cable, whereby the motorcycle-carrying dolly can be easily pulled onto the tilted bed of a roll-back tow truck by one person.

It is another object of the present invention to provide a device of the character described having a relatively low dolly floor, such that a disable motorcycle can be put onto the dolly without lifting the motorcycle to a high elevation above the ground.

It is another object of the present invention to provide a device of the character described whereby the entire operation of placing the disabled motorcycle onto the dolly, securing the motorcycle to the dolly in an upright position, and securing the motorcycle-carrying dolly onto the bed of a truck can easily be accomplished by one person.

Further objects and advantages of my invention will become apparent from a consideration of the drawings and ensuing description thereof.

DRAWINGS

DESCRIPTION

Figure 1:
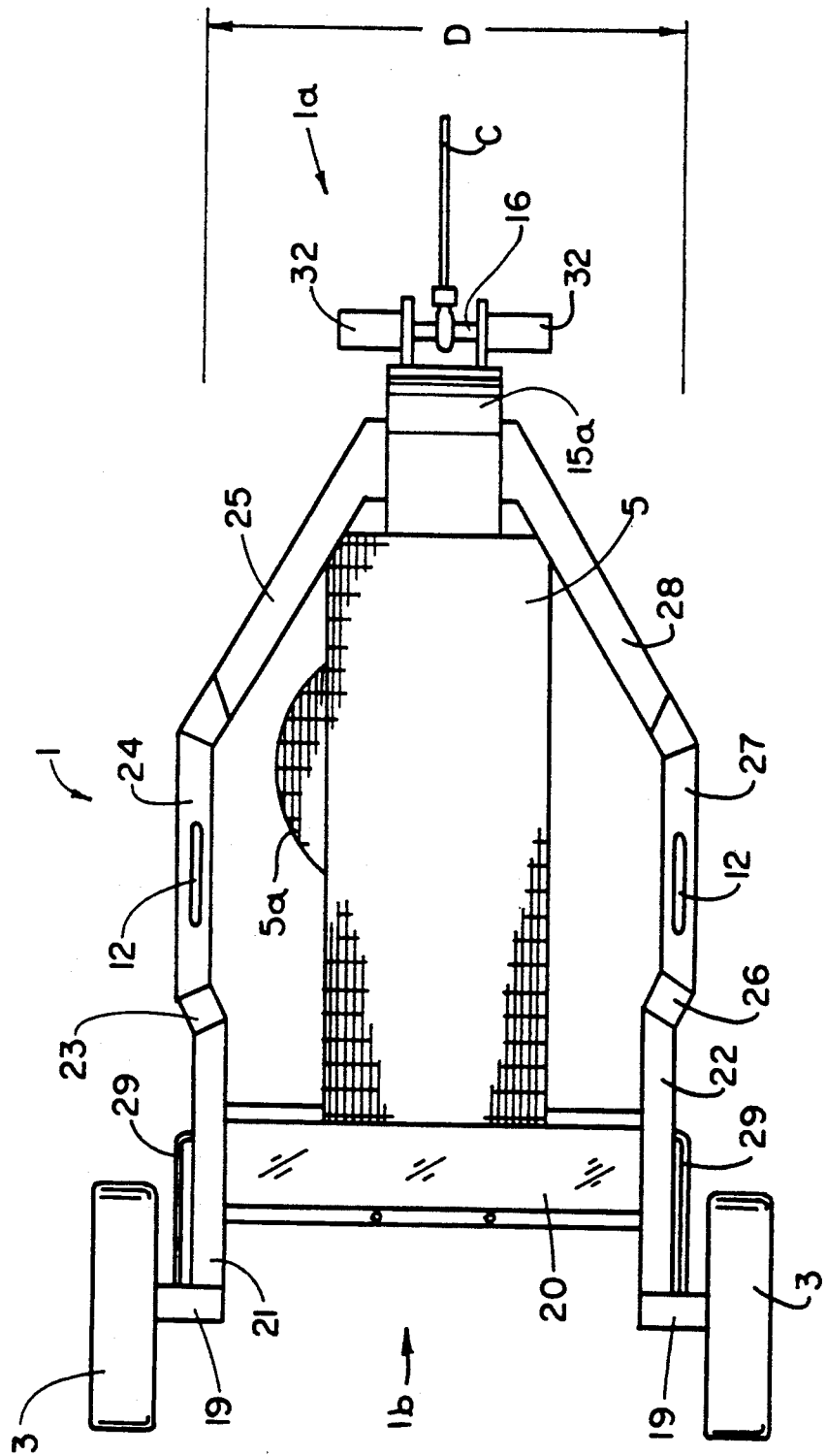
FIG. 1 is a plan view showing the top of the present invention.
Figure 2:
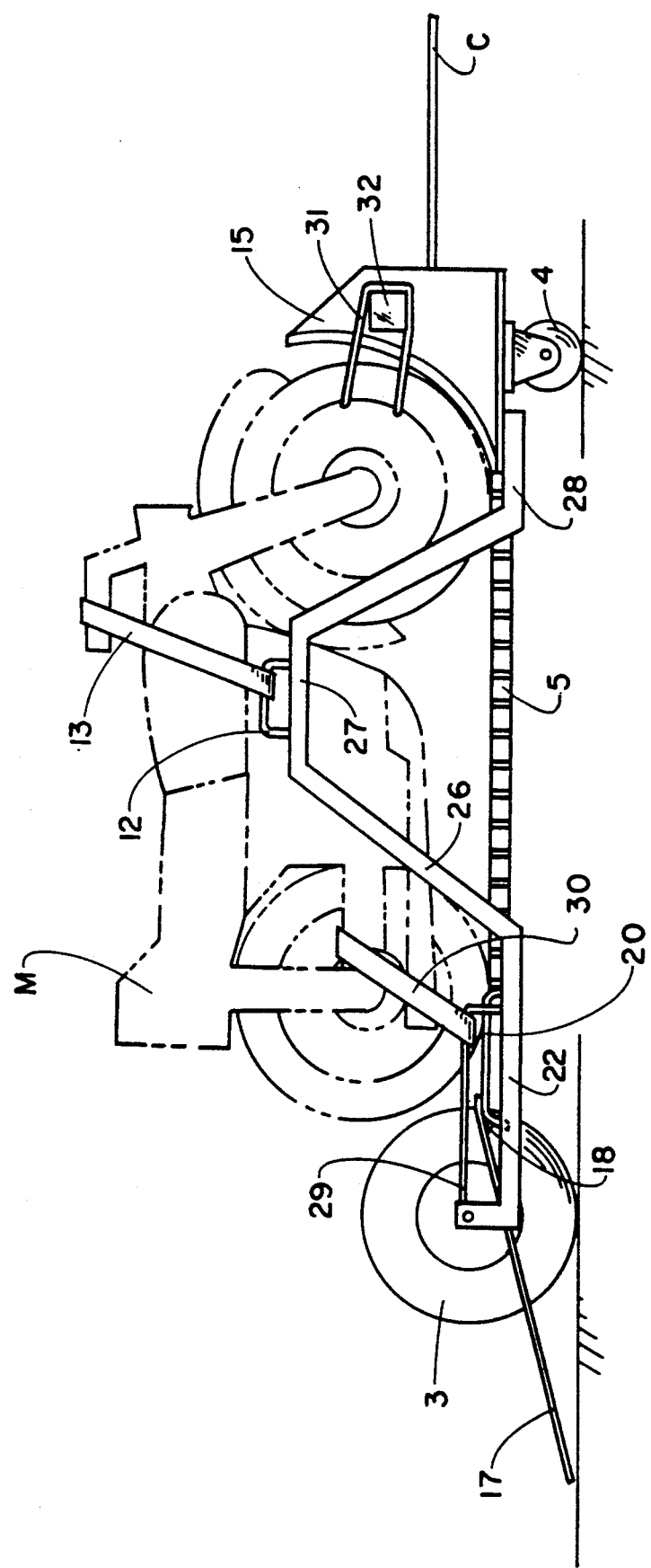
FIG. 2 is a side elevation of the present invention, showing a motorcycle positioned on the dolly.
Figure 3:
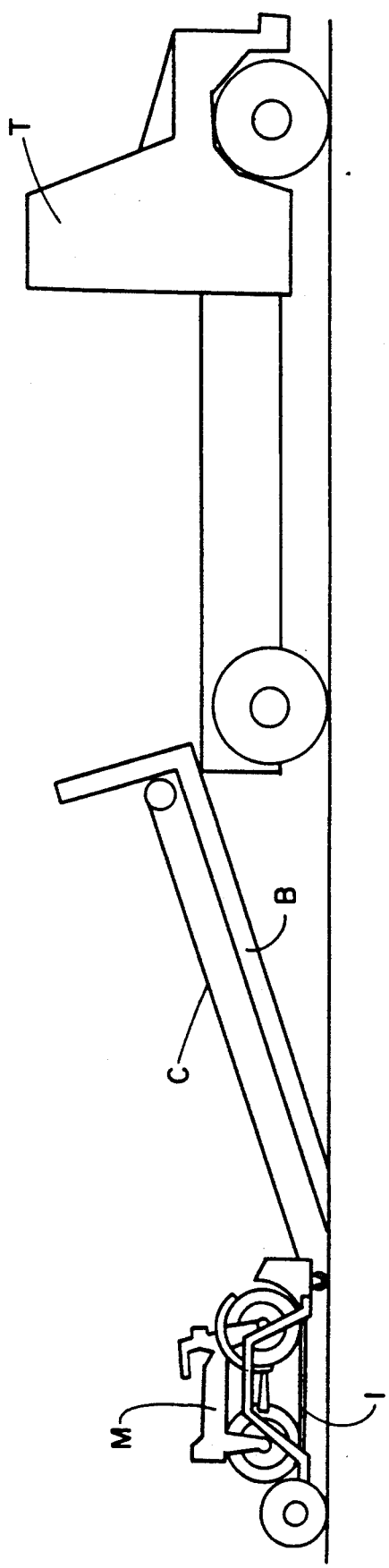
FIG. 3 is a side elevation of the present invention showing the dolly carrying a motorcycle.

The disclosed invention is a multi-wheeled dolly (generally designated 1 in the figures) adapted to support an upright motorcycle M. As will be demonstrated, the dolly 1 is particularly well suited to be pulled onto, and subsequently secured to, the bed B of a roll-back type tow truck T.

The preferred embodiment of the invention generally comprises a dolly 1 having a forward end 1a, and a rear end 1b. The rear end of the dolly 1b is supported by a pair of pneumatic wheels 3 with independent axles 19, located on a common axis which is perpendicular to the longitudinal centerline of the dolly 1. The forward end of the dolly 1a is supported by a single swivel wheel 4 which is located on the longitudinal centerline of the dolly 1.

The left side of the dolly 1 is constructed of a left rear frame member 21, a left push rail 23, a left elevated side rail 24, and a front frame member 25. The right side of the dolly is constructed of a right rear frame member 22, a right push rail 26, a right elevated side rail 27, and a front frame member 28. In the preferred embodiment of the invention, the left and right side frame and rail members (21, 22, 23, 24, 25, 26 and 27), are all constructed of square steel tubing.

A rear decking member 20, preferably constructed of formed sheet metal, extends between, and is welded to, the dolly's left rear frame 21 and the dolly's right rear frame 22, respectively, as shown in FIG. 1. The rear decking member 20 serves the dual purposes of providing structural strength to the dolly 1 and providing a deck upon which a motorcycle M can be supported. A substantially horizontal forward floor 5 is welded to the rear decking 20 and to the left and right front frame members 25 and 28, respectively. In the preferred embodiment of the invention the forward floor member 5 is nominally about 24 inches wide. As shown in FIG. 1, a forward floor extension 5a may be provided on one side of the forward floor 5 to provide a suitable platform for the operator to stand on while dismounting the motorcycle.

The forward floor member 5 is preferably constructed of steel grating. In the preferred embodiment of the invention the rear wheels 3 are approximately 14 inches in diameter. Preferably, the top of the rear decking 20 and the top of the forward floor 5 are flush with each other, and are at an elevation of approximately 4 or 5 inches relative to the bottom of the wheels 3.

The left and right elevated side rails 24 and 27, respectively, are at a raised elevation relative to the top of the forward floor member 5, and are each positioned outboard of the left and right sides of the forward floor member 5. A center strap eye 12 is preferably located on the top of each side rail 24 and 27, respectively, by which tie down straps 13 can be used to secure a motorcycle M to the dolly 1. Left and right inclined push rails 23 and 26, respectively, extend downward and rearward from the left and right elevated side rails 24 and 27, respectively. Rear strap eyes 29 are secured to the left and right rear frames 21 and 22, respectively, by which tie down straps 30 can be used to secure a motorcycle M to the dolly 1.

A wheel stop 15 is secured to the front of the dolly 1. The rearward face 15a of the wheel stop 15 is preferably concave-shaped so as to provide a convenient nest for the front wheel of a motorcycle M. The rearward face 15a of the wheel stop 15 preferably extends from the forward floor member 5, up to an elevation corresponding to at least the elevation of the forward axle of a typical motorcycle M when said motorcycle M is standing in an upright position on the dolly 1.

A cable-attachment bar 16 is provided at the front end 1b of the dolly, preferably on the front side of the wheel stop 15, as shown in FIG. 1.

In the preferred embodiment of the invention, a detachable ramp 17 is provided with at least one ramp hook 18. The ramp hook 18 is adapted to temporarily engage the rear side of the rear decking, thereby allowing the ramp to be selectively secured to, or removed from, the rear end 1b of the dolly.

OPERATION

In order to position a motorcycle M onto the dolly 1, the forward end of a detachable ramp 17, preferably comprising a ramp hook 18, is placed against the rear decking member 20. The ramp hook 18 is adapted to temporarily engage the rear decking member 20, so that the ramp 17 does not inadvertently fall down when a motorcycle is rolled upon it. The rear end of the detachable ramp 17 rests upon the ground, thereby providing an inclined surface between the ground and the rear decking member 20 by which a motorcycle can be easily rolled up onto the dolly 1. In the preferred embodiment of the invention, the detachable ramp 18 is approximately 18 to 24 inches long. It will be appreciated that this, relatively short, length of the detachable ramp 17 allows at least one wheel of the motorcycle M to be either on the dolly 1 or on the ground at all times while the motorcycle M is being rolled onto the dolly.

As indicated above, in the preferred embodiment of the invention the rear end 1b of the dolly is preferably supported by a pair of 14-inch diameter wheels 3. The top of the rear decking 20 and the forward floor 5 of the dolly are each preferably only about 4 or 5 inches above the ground (i.e. above the bottom of the rear wheels 3). Thus, it will be understood that in the preferred embodiment of the invention, the top of the rear decking 20 and the forward floor 5 of the dolly are each at an elevation below the common axis of the two rear wheels 3. Because of this feature (i.e. the relatively low elevation of the dolly's forward floor 5 and rear decking 20), it is not necessary for the motorcycle M to be lifted to a very high elevation in order to load it onto the dolly 1. Accordingly, it will be appreciated that, although a relatively short ramp 17 may be used for rolling a motorcycle M onto the dolly 1, the angle of incline between the surface of the ramp 17 and the ground is small, thereby providing a high mechanical advantage and facilitating the on-loading of the motorcycle M onto the dolly 1 by a single person's pushing the motorcycle M.

In the preferred embodiment of the invention, the left and right side frame and rail members (21, 22, 23, 24, 25, 26 and 27), are all constructed of 2-inch square steel tubing. It will be appreciated by those skilled in the art that the underside of a trailer bed having an elevation corresponding to the disclosed minimal elevation of the dolly's rear decking 20, forward floor 5, and side frame and rail members (21, 22, 23, 24, 25, 26, and 27) would not be practical or feasible for common trailers which are typically designed to travel along public streets, (primarily because such the undersides of such trailers would tend to "bottom" out on the highways). However, the minimal elevations of the dolly's rear decking 20, forward floor 5, and side frame and rail members (21, 22, 23, 24, 25, 26 and 27) in the present invention are both practical and advantageous because the dolly is specifically adapted to be used in conjunction with a roll-back tow truck T (rather than directly on a highway).

Once the motorcycle has been rolled onto the dolly 1, the motorcycle M is rolled forward until its front wheel is nested against the reward convex face of the wheel stop 15a. With the motorcycle M in an upright position, one or more center tie down straps 13 may be attached to the center strap eyes 12 and to the motorcycle M so as to secure the motorcycle in an upright position. A forward strap 31 may be secured to the forward strap posts 32, by which the front end of the motorcycle can be held in position against the wheel stop 15. Rear strap eyes 29 are located at the rear of the dolly 1 to facilitate securing the rear of the motorcycle M to the dolly 1 with one or more rear tie down straps 30. The detachable ramp 17 may then be removed from the rear of the dolly 1 and stored in a convenient place (such as beneath the motorcycle M, on top of the forward floor 5).

It will be appreciated that the above described on-loading, positioning and securing of the motorcycle M onto the dolly 1 can easily be accomplished by one person.

Figure 4:
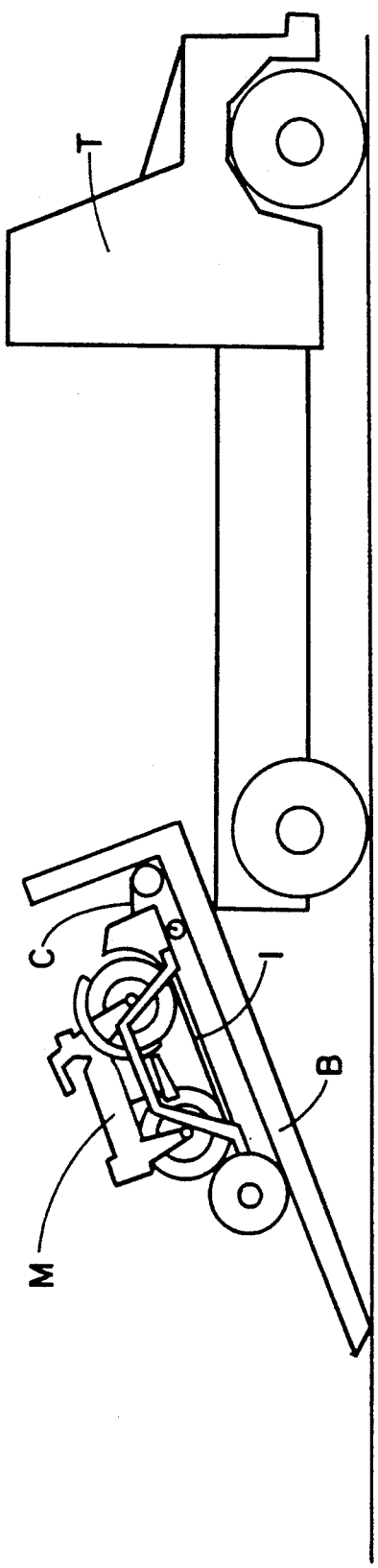
FIG. 4 is a side elevation of the present invention showing the dolly secured to a tilted bed of a roll-back tow truck; and, FIG. 5 is a side elevation showing the dolly, carrying an upright motorcycle, secured to the horizontal bed of a roll-back tow truck.
Figure 5:
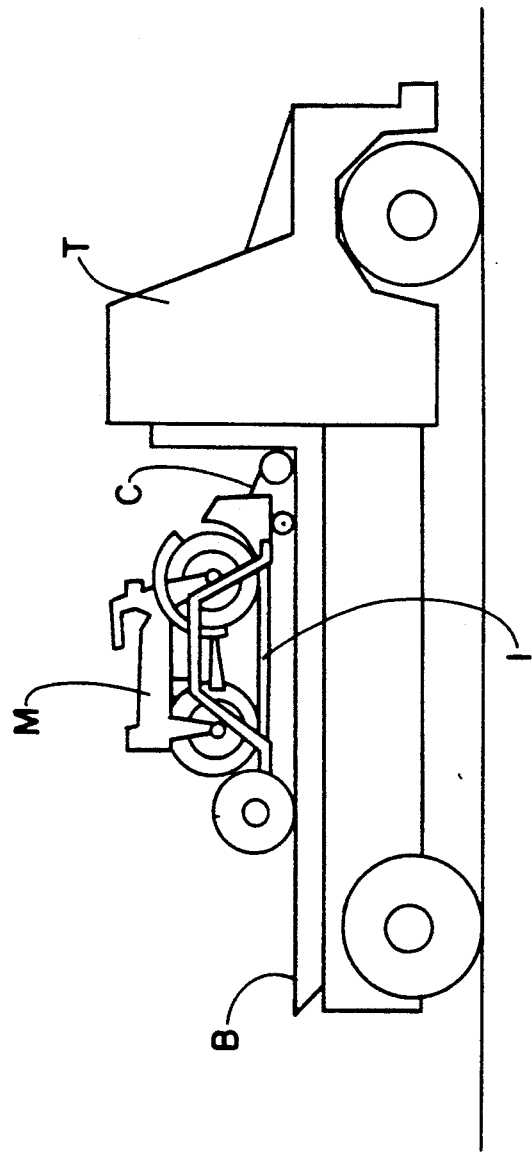

FIGS. 4, 5 and 6 sequentially show how the dolly 1 (with an attached motorcycle M) can be loaded onto, and transported by, a common roll-back tow truck T.

Referring to FIG. 4: A common roll-back tow truck T is moved into position in front of the dolly 1. The bed B of the truck is extended rearwardly and tilted down until its rear end rests on the ground. The free end of a cable C (whose opposite end is attached to a power winch on the truck T) is then secured to the dolly's cable attachment bar 16. The winch is then activated, thereby pulling the dolly 1 (and the motorcycle M attached thereto) up onto the tilted bed B of the truck. In the preferred embodiment of the invention, the cable attachment bar 16 is a rigid horizontal bar secured to the forward side of the wheel stop 15. This single horizontal bar construction of the cable attachment bar 16 is preferable as it is structurally sound and relatively simple to manufacture. It will be appreciated by those skilled in the art that such a simple construction would not be practical for hitching a highway trailer onto a towing vehicle, as such highway trailers must typically permit rotation about two axes (i.e. horizontally and vertically).

In the preferred embodiment of the invention the rear wheels 3 are located at the extreme rear of the dolly 1. That is, no part of the dolly extends behind either of the two rear wheels 3. It will be appreciated by those skilled in the art that this construction of the dolly 1 allows the front end of the dolly 1a to be lifted or tilted upward (as when pulled onto the tilted truck bed B) without causing any part of the dolly 1 (other than its wheels 3) to drag on the ground.

Once the rear wheels 3 and the rest of the dolly have been pulled (via the cable C) onto the truck bed B as shown in FIG. 4, the bed B may then be retracted, as shown in FIG. 5.

In the preferred embodiment of the invention, the width of the forward floor 5 is approximately 24 inches, which is sufficiently wide to provide room for a person to place his feet on the floor 5 while straddling the motorcycle M while it is being rolled onto the dolly 1.

In the preferred embodiment of the invention, the rear wheels 3 are spaced approximately 55-inches apart, and the outside dimension D of the dolly frame is at least four feet. It will be appreciated by those skilled in the art that the disclosed construction of the dolly 1 provides a particularly stable apparatus to which a motorcycle M may be secured. The relatively high stability of the device is primarily provided by the relatively wide spacing of the rear wheels 3, the relative wide outside dimension D of the dolly frame, and by the relatively low elevation of the dolly's rear decking 20 and forward floor 5 (and the corresponding low elevation of the motorcycle's center of gravity). In addition to the primary stability of the apparatus described above, it will be appreciated by those skilled in the art that, even if the dolly 1 were to begin to tip to one side, the relatively wide outside dimension D of the dolly frame and the relatively low elevation (i.e. 2") of the bottom of the rail and frame members (21, 22, 25 and 28) result in the front frame members' (25 and 28) contacting the ground, thereby prohibiting the apparatus from further tipping over.

Once the motorcycle M is secured to the dolly 1, and the dolly is secured to the truck bed B, and the truck bed is restored to its retracted position (FIG. 5), the combined dolly/motorcycle can be safely transported across public streets.

The dolly 1 and its attached motorcycle M can be removed from the roll-back tow truck in reverse to the procedure described above. Once the dolly 1 and its attached motorcycle M are off-loaded from the truck bed B, the cable C may be detached from the cable attachment bar 16; the detachable ramp 17 may be installed against the rear decking 20; and the rear, center, and forward straps (30, 13 and 31, respectively) may be safely disconnected from the motorcycle M.

The motorcycle M may then be removed from the dolly 1 by rolling it backwards and down the ramp 17. Off-loading of the motorcycle M can be easily accomplished by one operator. The operator sits on the motorcycle's seat and pushes with his feet against the left and right push rails 23 and 26, respectively. The push rails 23 and 26 are spaced approximately 45 inches apart, and are located approximately 58 inches behind the rearward face of the wheel stop 15a. The rearward face of the push rails are at an angle of between 45 and 85 degrees from horizontal. It has been found that the described construction of the push rails 23 and 26 provides a convenient surface against which a person sitting on an upright motorcycle M on the dolly 1 can push in order to roll the motorcycle backwards relative to the dolly 1.

It will be understood from review of the foregoing disclosure that the described on-loading and off-loading of the motorcycle M to and from the dolly 1, the described on-loading and off-loading of the dolly-carrying-motorcycle to and from the tow truck's bed B, the described positioning, retraction and extension of the roll-back tow truck's bed B, and the securing of the motorcycle to the dolly 1, can all be accomplished by one operator working alone.

As discussed above, the operation of the present invention (and in particular, the stability and the ease of rolling a disabled motorcycle onto the device) is enhanced by the relatively low elevation of the dolly's rear decking 20 and forward floor 5. It will be appreciated by those skilled in the art that the disclosed low elevation of the dolly floor is enabled by the operation of the present invention in conjunction with common roll-back tow trucks. Because the typical roll-back tow truck is, itself, adapted to traverse public highways, the disclosed dolly can be constructed (and, indeed, will function well) without shock absorbers or springs between its axles 19 and its left and right rear frame 21 and 22, respectively. That is, the rear wheel's axles 19 may be rigidly attached to the dolly's frame (such as at frame members 21 and 22).

While the above description contains many specificities, these should not be construed as limitations on the scope of the invention, but rather as an exemplification of one preferred embodiment thereof. Many other variations are possible, for example:

- The dolly's frame can be constructed of common structural materials other than square steel tubing;
- The floor 5 can be constructed of materials other than steel mesh, (for example perforated and non-perforated metal sheets, fiberglass, etc.);
- The ramp 17 may be permanently hinged (i.e. rather than detachable) to the rear of the decking 20;
- The invention may be operated (i.e. a motorcycle may be on-loaded and off-loaded) without the use of a ramp, (for example, the decking 20 may be constructed at a low enough elevation that the motorcycle can be rolled directly onto the decking 20);
- The rear wheels 3 need not be pneumatic, but may alternatively be liquid-filled or solid; and
- The rear wheels 3 may be independently connected to a common axle.

Accordingly, the scope of the invention should be determined not by the embodiment illustrated, but by the appended claims and their legal equivalents.

I claim:

1. A novel dolly adapted to carry thereon an upright, two-wheeled motorcycle, comprising:

a chassis, said chassis having a front end and a rear end, a right side and a left side, and a longitudinal axis extending from said front end to said rear end;

a substantially horizontal floor member having a front end and a rear end and a right side and a left side, said floor member being attached to said chassis;

first and second rear wheels;

means for supporting said rear end of said chassis from each of said rear wheels;

a front wheel;

means for supporting said front end of said chassis from said front wheel;

means in communication with said front end of said chassis for applying an external towing force to said front end of said chassis;

means for securing said motorcycle to said dolly in an upright position; and, a wheel stop member, said wheel stop member being located at the forward end of said floor member and being adapted to restrict forward movement of said motorcycle when said motorcycle is disposed on top of said floor member;

and wherein said first and second rear wheels are aligned on a common axis which is perpendicular to the longitudinal axis of said chassis;

and said common axis of said first and second rear wheels is at an elevation at least as high as the elevation of said substantially horizontal floor member;

and wherein said wheel stop member comprises a rearward directed convex surface, said rearward directed convex surface extending from said floor member to an elevation at least as high as the center of the forward wheel of said motorcycle when said motorcycle is standing upright on said floor;

and wherein said chassis comprises an elevated left side rail member on said left side of said chassis;

and an elevated right side rail member on said right side of said chassis;

wherein said elevated left side rail is at an elevation above said floor member;

and said elevated right side rail member is at an elevation above said floor member;

and wherein said means for securing said motorcycle to said dolly in an upright position comprises a first eye member disposed on said elevated left side rail member; and a second eye member disposed on said elevated right side rail member; and an elongated rigid member attached to said wheel stop member; and a plurality of elongated flexible strapping members;

and wherein said floor member comprises a substantially horizontal rear decking member having a left side and a right side and a rear end;

said left side of said rear decking member being rigidly attached to said left side of said chassis;

said right side of said rear decking member being rigidly attached to said right side of said chassis;

and said rear end of said rear decking member being at least as far forward as said common axis of said first and second rear wheels;

and wherein said means for supporting said front end of said chassis from said front wheel comprises a swivel connection;

and wherein said front wheel has a smaller diameter than each of said first and second rear wheels;

and wherein said means for applying an external towing force to said front end of said chassis comprises an elongated rigid horizontal bar rigidly attached to said front end of said chassis;

and wherein said chassis further comprises a first elongated inclined member disposed on said left side of said chassis; and a second elongated inclined member disposed on said right side of said chassis;

said first elongated inclined member being disposed rearward of said elevated left side rail member, and forward of said first rear wheel;

and said second elongated inclined member being disposed rearward of said elevated right side rail member, and forward of said second rear wheel;

whereby an operator may apply a forward direction push to each of said elongated inclined members while said operator is seated upon said motorcycle when said motorcycle is in an upright position on said floor member.

* * * * *